United States Patent [19]
Anthony et al.

[11] Patent Number: 4,919,562
[45] Date of Patent: Apr. 24, 1990

[54] TORQUE TRANSMITTING MEMBER

[75] Inventors: William M. Anthony, Scottsdale; Hans R. Ringger, Mesa, both of Ariz.

[73] Assignee: Allied-Signal Inc., Morris Township, Morris County, N.J.

[21] Appl. No.: 272,612

[22] Filed: Nov. 17, 1988

Related U.S. Application Data

[62] Division of Ser. No. 74,755, Jul. 17, 1987, Pat. No. 4,828,422.

[51] Int. Cl.$^5$ ................................................ B25G 3/00
[52] U.S. Cl. ........................................ 403/16; 403/359; 403/24
[58] Field of Search .................. 403/16, 24, 294, 355, 403/359, 364; 464/52, 53, 154, 156, 158, 182; 415/122 R

[56] References Cited

U.S. PATENT DOCUMENTS

| Re. 27,126 | 5/1971 | Gingery | 29/402.09 |
|---|---|---|---|
| 2,015,430 | 9/1935 | Matthews et al. | 464/179 |
| 2,443,688 | 6/1948 | McFarland | 403/29 |
| 2,508,832 | 5/1950 | McAninch | 403/359 |
| 2,639,496 | 5/1953 | Hartzell | 29/451 |
| 3,197,216 | 7/1965 | Jackson | 277/137 |
| 3,222,772 | 12/1965 | Leyner | 403/359 X |
| 3,396,554 | 8/1968 | Westercamp | 403/355 X |
| 3,430,993 | 3/1969 | Leshinsky | 403/359 |
| 3,574,366 | 4/1971 | Thostenson | 403/359 |
| 3,588,154 | 6/1971 | Volght et al. | 403/359 X |
| 3,621,945 | 11/1971 | Spry | 188/71.5 |
| 3,622,185 | 11/1971 | Rosen et al. | 403/316 |
| 3,631,688 | 1/1972 | Quick | 464/182 |
| 3,884,049 | 5/1975 | Pauli | 464/182 X |
| 3,961,410 | 6/1976 | Reed | 29/282 |
| 3,990,013 | 11/1976 | Badger | 403/359 X |
| 4,098,096 | 7/1978 | Chard et al. | 403/359 |
| 4,288,900 | 9/1981 | Overton | 29/263 |
| 4,473,317 | 9/1984 | Bolang | 403/359 |
| 4,476,617 | 10/1984 | Kobylarz | 29/264 |
| 4,606,671 | 8/1986 | Rasmussen | 403/359 |
| 4,623,277 | 11/1986 | Wayne et al. | 464/182 X |
| 4,701,068 | 10/1987 | Andrews et al. | 403/359 |

FOREIGN PATENT DOCUMENTS

| 1228258 | 8/1960 | France . |
| 770683 | 3/1957 | United Kingdom . |
| 1107325 | 3/1968 | United Kingdom . |

Primary Examiner—Mark Rosenbaum
Assistant Examiner—Frances Chin
Attorney, Agent, or Firm—Joseph R. Black; James W. McFarland; Terry L. Miller

[57] ABSTRACT

A male-female spline coupling between two shafts includes a polymer spline insert removably carried by the female shaft. The spline insert engages with the female shaft in torque transmitting relation and defines a wear resistant spline surface engaging the male shaft to accommodate limited angular and radial misalignment while rotationally transmitting torque therebetween. The coupling includes provision for removal of the spline insert and replacement thereof with a fresh insert with a minimum of tools and in very short time. Tools for both removal and replacement of the spline insert are disclosed.

7 Claims, 2 Drawing Sheets

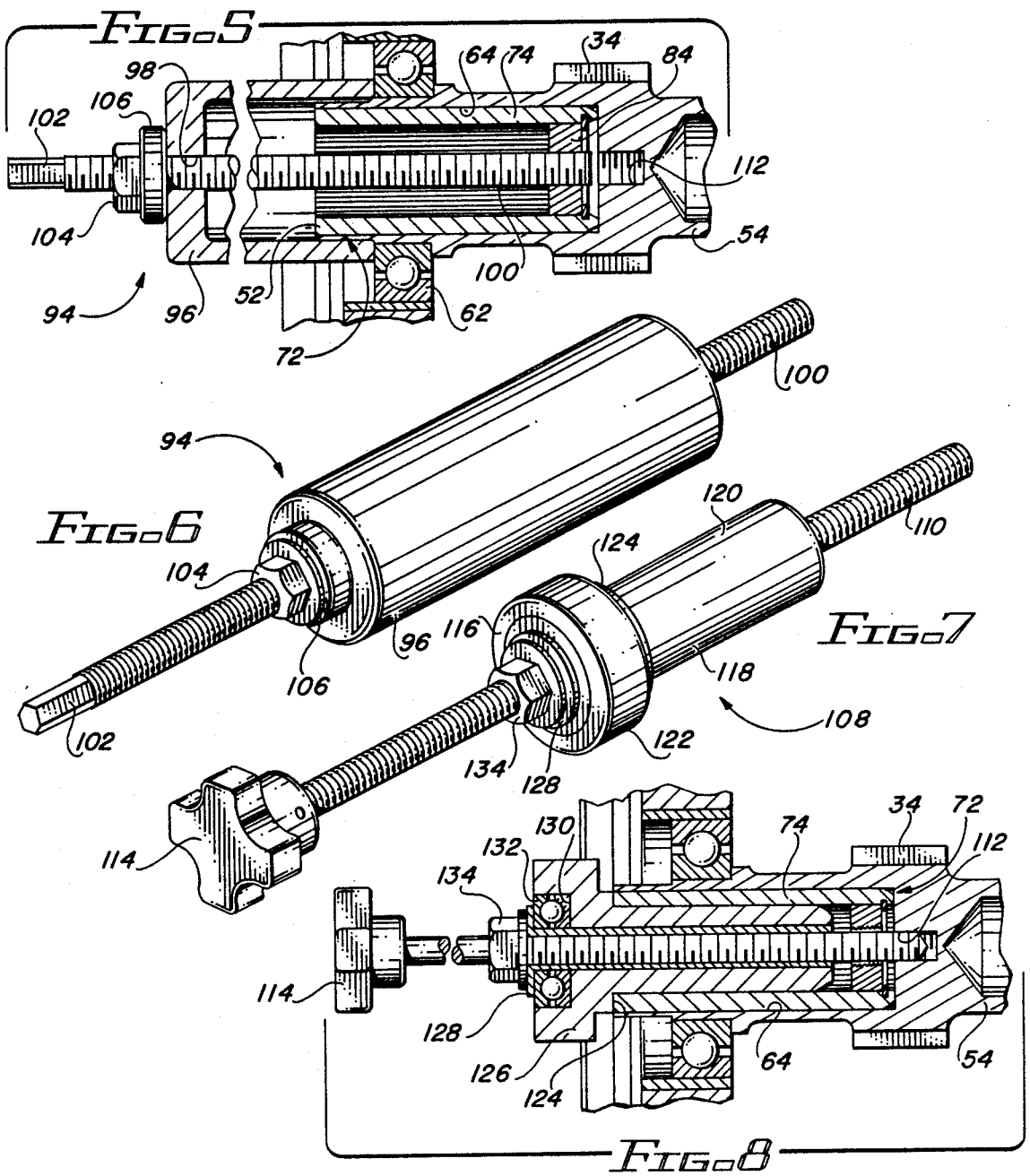

TORQUE TRANSMITTING MEMBER

This is a division of application Ser. No. 074,755 filed July 17, 1987 now U.S. Pat. No. 4,828,422.

The field of this invention is rotational torque transmitting members. More particularly, the present invention relates to torque transmitting spline couplings employed between rotational shafts to accommodate limited angular and radial misalignment therebetween while rotationally transmitting torque between the two shafts.

Conventional turbine engines employ a tubular shaft member having a female spline defined therein coupling with a male spline shaft of auxiliary devices in order to drive auxiliary devices from the turbine engine or to receive torque from the auxiliary device, such as a starter motor. Unfortunately, such spline torque transmitting couplings are generally defined by a tubular steel shaft receiving a steel extension of an auxiliary component shaft. Consequently, if such shafts are misaligned either angularly, radially, or in both senses, the spline surfaces of the two shafts experience very rapid wear which eventually results in loss of function of the spline coupling between the turbine engine and its auxiliary component. A conventional solution to this problem has been to provide a polymer wear resisting and somewhat lubricious member either as an insert to the tubular shaft or as a sleeve upon the shaft of the auxiliary device. However, such wear resisting polymer intermediate members will nevertheless experience wear during their service life and require replacement. Such replacements of wear resisting polymer intermediates or of metallic shafts of turbine engines conventionally require considerable effort and result in extended downtime for the aircraft or other vehicle employing such a turbine engine. Accordingly, it is an object of the present invention to allow simplified and rapid replacement of torque transmitting members which intercouple a pair of shafts.

Accordingly the present invention provides a torque transmitting coupling of generally elongate tubular configuration having a right circular cylindrical shape in cross-section. The tubular member defines an outer surface having an axially extending male spline shape and an inner surface also defining an axially extending female spline shape. At one end of the torque transmitting member are defined a circumferentially spaced apart axially extending plurality of portions, each of substantially similar angular arc. The axially extending portions cooperatively define a similar plurality of crenels, each also of generally similar angular arc. An annular washer-like star member is received within the torque transmitting member at the one end and defines a plurality of circumferentially spaced apart radially outwardly extending arm portions. Each of the arm portions substantially matches the angular arc of the crenels of the torque transmitting member and is respectively received therein. The star member and the torque transmitting member cooperatively define axially disposed contacting thrust surfaces respectively within the crenels and upon the radially extending arm portions thereof. Consequently, axial force applied to the starter member is transferred to the torque transmitting member. The star member also defines means for cooperatively coupling with a removal tool providing for movement of the star member and of the torque transmitting member together from a position of utilization.

In an exemplary use of the torque transmitting member described above, a combustion turbine engine is provided with an elongate tubular shaft defining a female spline. The torque transmitting member is received within the tubular shaft with the male spline of the member engaging the female spline of the shaft. Consequently, the torque transmitting member provides a female spline within the tubular shaft. Such female spline may be engaged by an auxiliary device of the combustion turbine engine in order to transfer torque between the auxiliary device and the engine. The torque transmitting member is disposed within the tubular shaft with the star member thereof axially spaced from the opening of the tubular shaft. Consequently, a removal tool may be inserted into the shaft through the torque transmitting member to engage the star member. Withdrawal of the star member from the tubular shaft also causes withdrawal of the torque transmitting member therefrom. Consequently, a replacement torque transmitting member may be installed into the shaft after a worn similar member has been removed therefrom.

The present invention offers as an advantage, for example the ability to quickly and easily replace worn female spline surfaces of a combustion turbine engine. Such replacement of worn female spline surfaces may be accomplished without significant disassembly of the combustion turbine engine. Advantageously, such replacements may take place with the turbine engine installed on an aircraft or within another vehicle so that removal of the engine and excessive downtime for the vehicle is not required. It will be seen then that the present invention obviates the need for protracted downtimes of vehicles and of combustion turbine engines employed therein in order to facilitate replacement of worn female spline surfaces thereof.

BRIEF DESCRIPTION OF THE DRAWING FIGURES

FIG. 1 provides a schematic representation of a combustion turbine engine having a gear train coupling a power output shaft of the turbine engine to a power absorbing device and to an auxiliary device of the engine.

FIG. 2 is a somewhat schematic perspective view of a combustion turbine engine having a gear train disposed within a housing providing a mounting for torque transmitting coupling of an auxiliary device to the engine.

FIG. 3 provides a fragmentary perspective view of a shaft member defining a portion of the gear train of the combustion turbine engine illustrated in FIG. 2 and receiving a torque transmitting member according to the present invention.

FIG. 4 depicts component parts of a torque transmitting member according to the present invention.

FIGS. 5–8 illustrate fragmentary views partially in cross-section of a combustion turbine engine including a torque transmitting member according to the present invention and of tools employed to remove the component parts of the torque transmitting member illustrated in FIG. 4, and to effect replacement of such components.

DETAILED DESCRIPTION OF THE PREFERRED EMBODIMENT

Figure 1:
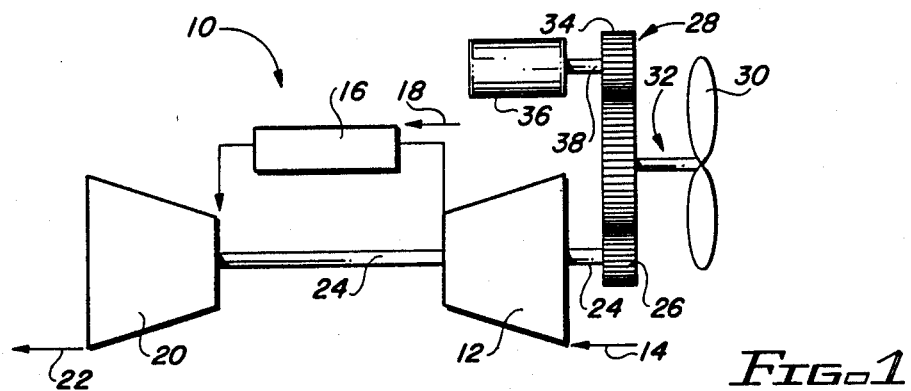

FIG. 1 schematically depicts a combustion turbine engine 10 including a compressor 12 inducting ambient air 14 and delivering this air pressurized to a combustor 16. Within the combustor 16, fuel 18 is mixed with the pressurized air and burned to produce a flow of pressurized motive gases which are supplied to a turbine 20. The turbine 20 expands the pressurized gases to ambient pressure for discharge as is depicted by arrow 22 and rotationally applies torque to a shaft 24 driving the compressor 12. The shaft 24 also is drivingly connected with a pinion gear 26 of a gear train generally referenced with the numeral 28. The gear train 28 drives a power absorbing element 30 via a shaft 32. For example, the power absorbing element may be a propulsion propeller for an aircraft as is depicted by FIG. 1. The gear train 28 also includes a gear member 34 which is drivingly connected with an auxiliary device 36 by a coupling shaft 38. By way of example only, the auxiliary device 36 may comprise an alternator for providing electrical power to the vehicle employing the engine 10. Alternatively, the auxiliary device 36 may comprise a starting apparatus for the combustion turbine engine 10.

Figure 2:
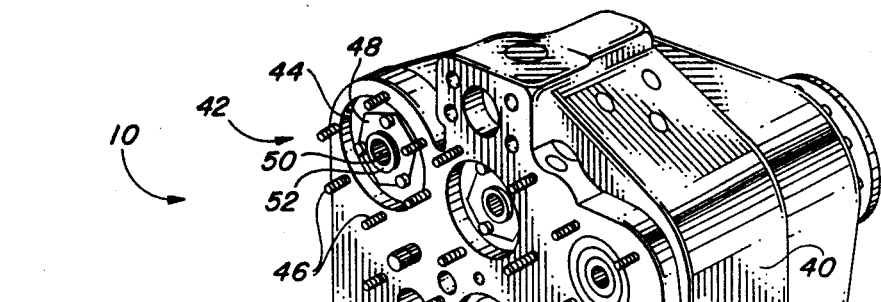

FIG. 2 somewhat schematically depicts a combustion turbine engine 10 having a housing 40. The housing 40 defines a mounting pad 42 upon a gear case portion thereof for receiving an auxiliary device 36 such as is depicted schematically in FIG. 1. The mounting pad 42 includes an annular raised boss 44 from which extends a plurality of studs 46 for securing the auxiliary device 36 to the gear case of the combustion turbine engine. Within the boss 44 the mounting pad 42 also includes a bearing retainer member 48 defining an opening or aperture 50. Projecting through the aperture 50 of the bearing retainer 48 is an end portion 52 of a shaft member drivingly connected in the gear train 28 as is schematically depicted by FIG. 1.

Figure 3:
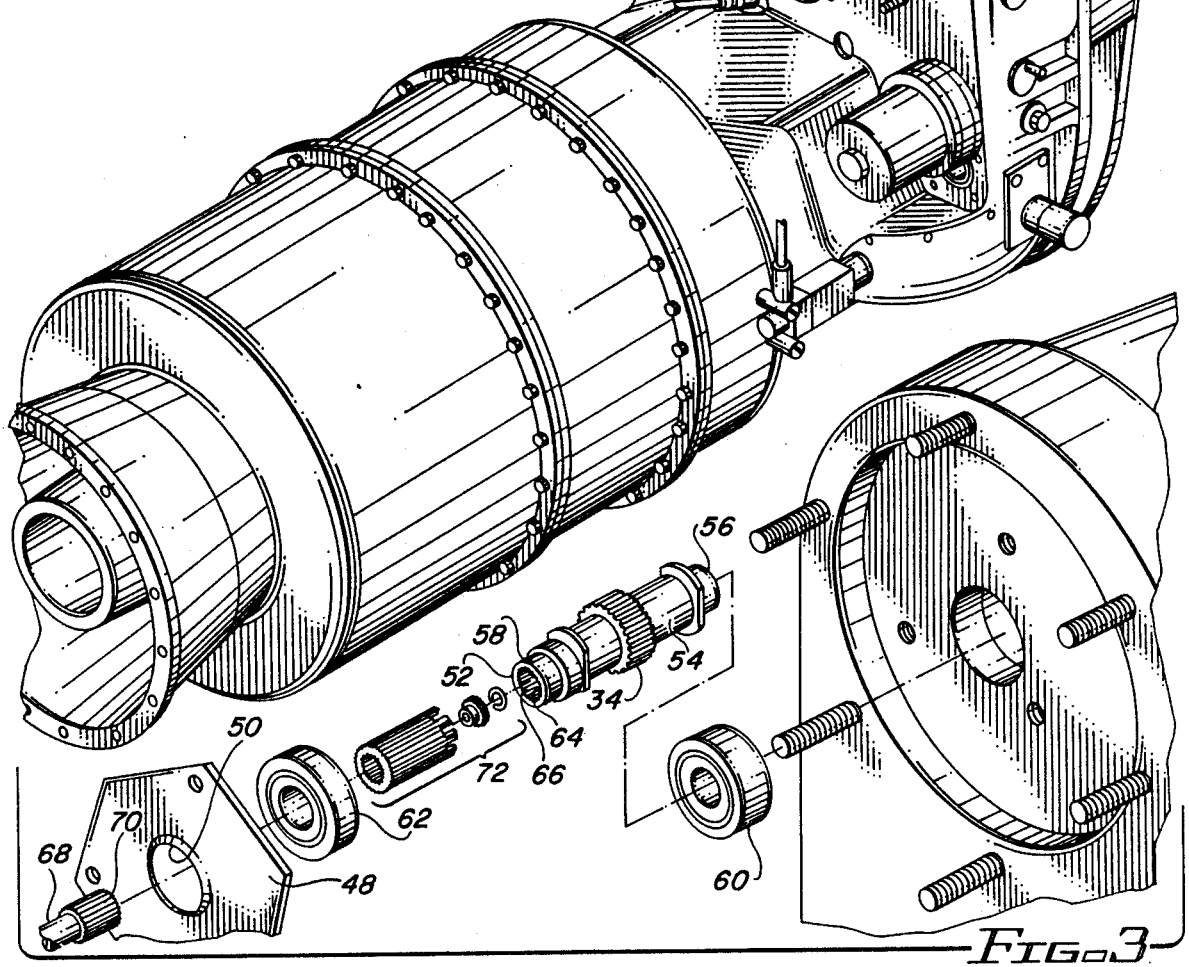

Viewing now FIG. 3, it will be seen that the shaft member 54 defines a pair of axially spaced apart bearing seat portions 56 and 58. The shaft member 54 is carried by a pair of axially spaced apart anti-friction bearings 60 and 62 which respectively engage the bearing seat portions 56 and 58. Intermediate of the bearing seats 56, 58 and bearings 60,62, the shaft portion 54 defines a spur gear portion 34 which is also depicted schematically in FIG. 1. The spur gear portion 34 is drivingly engaged by the gear train 28 housed within the gear case of housing 40 of the combustion turbine engine 10.

In order to drivingly couple the shaft 54 with an auxiliary device 36 as is schematically depicted in FIG. 1, the shaft 54 defines an axially extending stepped bore 64 opening outwardly within the end portion 52 and centrally within the mounting boss 44 of the gear case, viewing FIGS. 3, 4, 5 and 6. In order to drivingly couple in torque transmitting relation with a coupling shaft 38 of the auxiliary device 36, the shaft member 54 defines an axially extending female spline surface 66 within the bore 64. Viewing FIG. 3, it is seen that the auxiliary device 36 includes a shaft portion 68 having a male spline section 70 at a terminal end thereof. The male spline portion 70 is received within the bore 64 but is not drivingly engageable with the spline surface 66 thereof.

Viewing now FIG. 4, it will be seen that a torque transmitting assembly 72 is received within the bore 64 in driving relationship with the shaft member 54. This torque transmitting assembly receives therein the male spline portion 70 of the shaft 68 in torque transmitting driving relationship. The torque transmitting assembly 72 includes an elongate insert member 74 fabricated of wear resistant polymer material. By way of example only, the polymer material from which the insert member 74 is fabricated may be Torlon, a product of Amoco Chemicals Corp. The insert member 74 is elongate and generally of tubular configuration and defines on its radially outer surface 76 an axially extending male spline surface. Similarly, the insert member 74 defines an axially extending female spline surface 78 therewithin. The spline surfaces 76 and 78 extend continuously from one end of the insert member 74 to the other end thereof. At one end, the insert member 74 defines a circumferentially spaced apart plurality of axially extending portions 80. The axially extending portions 80 cooperate to define axially extending crenels 82 therebetween.

An annular washer-like star member or removal member 84 is received within the one end of the insert member 74 and defines a plurality of circumferentially spaced apart radially outwardly extending arm portions 86. The arm portions 86 are respectively received within the axially extending crenels 82 of the insert member 74. The radially outwardly directed end surfaces of the removal member 84 arm portions 86 collectively define an outer diameter which is less than that of the minor diameter defined by the male spline surface 76. However, the arm portions 86 extend radially outwardly approximately to the minor diameter of the male spline surface 76. Consequently, each of the radially outwardly extending arm portions 86 define an axially disposed surface 86A each engaging the insert member 74 within a respective one of the crenels 82. An axially extending through bore 88 of the removal member 84 defines a female thread extending therethrough. The removal member 84 is received within the one end of the insert member 74, and there is captively retained by a spiral snap ring retainer member 90. The retainer member 90 is received by a plurality of like circumferential notches 92 defined by each portion 80 of the insert member 74.

Viewing FIG. 5, it will be seen that the torque transmitting assembly 72 is received entirely within the bore 64 of shaft member 54. The male spline surface 76 of insert member 74 frictionally engages the female spline surface 66 of bore 64 within shaft member 54. In other words, the insert member 74 is an interference fit in bore 64 with the splines 66 and 76 drivingly engaging in torque transmitting relation. Thus, it is the insert member 74 of assembly 72 which defines a female spline surface 78 for driving engagement with the male spline portion 70 of shaft 68 of auxiliary device 36, viewing FIGS. 1 and 3.

In order to remove the torque transmitting assembly 72 from bore 64 of the shaft 54, a removal tool 94 is provided, viewing FIGS. 5 and 6. The tool 94 includes an elongate cup-like portion 96 which is receivable over the shaft end portion 52 to engage the inner race of bearing 62. The portion 96 defines a reduced diameter bore 98 through which passes an elongate threaded shaft 100. The shaft 100 defines a driving part 102 and carries a nut 104 capturing a thrust washer 106 between the latter and cup portion 96.

In use of the tool 94 to remove a worn assembly 72 from an engine 10, the shaft 100 is threadably engaged with removal number 84 of the assembly, and the cup portion with bearing 62. Thereafter, drive part 102 is employed to prevent rotation of shaft 100 and the transmission of torque to portion 84 and assembly 72 while the nut 104 is threaded along the shaft 100 against washer 106. As a result, the tool 94 applies a straight axial tractive force to the assembly 72 without the application of torque which might make withdrawal more difficult. The assembly 72 is drawn from the bore 64 of shaft 54 and into the cup-like portion 96 of tool 94.

In order to install a new torque transmitting assembly 72 into the bore 64 of shaft 54, an installation tool 108 is provided, viewing FIGS. 7 and 8. The tool 108 includes an elongate threaded shaft 110 of a size smaller than the shaft 100 of tool 94. Consequently, the shaft 110 may pass through the bore 88 of removal member 84 to threadably engage a blind threaded bore 112 defined at the inner end of bore 64 by shaft member 54. The shaft 110 includes a drive part 114 by which it may be gripped for threading into engagement with bore 112, and which may be used to prevent rotation of the shaft 110 in later use of the tool 108 as will be explained.

Slidably received upon the shaft 110 of tool 108 is a guide assembly 116. The assembly 116 defines a stepped outer surface 118 providing a cylindrical portion 120 of approximately the same diameter as the inner diameter of insert member 74. That is, portion 120 is only slightly smaller than the minor diameter of spline surface 78 of the insert member 74. The portion 120 cooperates with an enlarged diameter portion 122 to define a shoulder 124. Viewing FIG. 5, it is seen that assembly 72 is receivable upon guide assembly 116 with shoulder 124 in engagement with an end of insert member 74. The portion 120 extends within the insert member 74, but does not contact the removal member 84.

The assembly 116 includes an inner sleeve part 126 relatively rotatable both on shaft 110 and within assembly 116, and defining a radially outwardly extending flange 128. A pocket 130 within assembly 116 receives a ball thrust bearing 132, while a nut 134 threadably engaged with shaft 110 is also engageable with the flange 128. In use of the tool 108, the fresh torque transmitting assembly 72 is received on the guide assembly 116. Thereafter, shaft 110 is inserted into bore 64 of shaft 54, with drive part 114 being used first to threadably engage shaft 110 with bore 112, and then to prevent further relative rotation of the shaft 110. Finally, the nut 134 is threaded along shaft 110 to force assembly 72 into bore 64 without applying any torque thereto which would make installation more difficult. Removal of the tool 108 leaves the fresh torque transmitting assembly installed in the shaft 54 of engine 10.

While our invention has been depicted and described with reference to one particular type of turbine engine and one particularly preferred embodiment of the invention, such reference is not intended to imply a limitation on the invention, and no such limitation is to be inferred. To those skilled in the pertinent art many modifications to and adaptations of the invention will no doubt occur. All such modifications and adaptations which fall within the spirit of the invention are intended to come within the scope of the appended claims. The invention is, therefore, intended to be limited only by the spirit and scope of the appended claims, which also provide additional disclosure and definition of the invention.

We claim:

1. Apparatus comprising an elongate, tubular insert member, said insert member defining on an outer surface thereof an axially extending male spline shape, and on an inner surface thereof also defining an axially extending female spline shape, at one end thereof said insert member defining a plurality of circumferentially spaced apart axially extending portions, said axially extending portions cooperatively defining a plurality of circumferentially spaced apart, equiangularly extending crenels, and a annular washer star member, said star member defining a plurality of circumferentially spaced apart, radially outwardly extending, and equiangularly extending arm portions, said star member being received in said insert member such that said arm portions are received in said crenels and positioned between said axially extending portions, said arm portions and said insert member cooperatively defining opposed, contacting thrust surfaces for transferring axially directed force from said star member to said insert member.

2. The invention of claim 1 wherein both said male spline shape and said female spline shape are defined by said insert member throughout its entire length.

3. The invention of claim 1 wherein each of said plurality of axially extending portions defines a circumferentially extending notch adjacent a distal end thereof, and further comprising a ring-like retainer member received in said circumferentially extending notches, said retainer member captively retaining said star member in said insert member.

4. The invention of claim 1 wherein said annular star member defines a through bore, and a female thread at said through bore.

5. The invention of claim 1 wherein, at said crenels, said arm portions subtend angles that are substantially equal to angles subtended by said crenels so that each of said arm portions abuts two of said axially extending portions.

6. The invention of claim 5 further comprising means for retaining said star member in said insert member.

7. The invention of claim 6 wherein said star member has a female threaded through bore.

* * * * *